United States Patent [19]

Schulte

[11] Patent Number: 5,537,323
[45] Date of Patent: Jul. 16, 1996

[54] NAVIGATION DEVICE VEHICLE COMPRISING THE DEVICE

[75] Inventor: Hans H. Schulte, Eindhoven, Netherlands

[73] Assignee: U.S. Philips Corporation, New York, N.Y.

[21] Appl. No.: 183,450

[22] Filed: Jan. 18, 1994

Related U.S. Application Data

[63] Continuation of Ser. No. 963,196, Oct. 19, 1992, abandoned.

[30] Foreign Application Priority Data

Oct. 29, 1991 [EP] European Pat. Off. ............ 91118392

[51] Int. Cl.⁶ .................................................. G05D 1/00
[52] U.S. Cl. ............................ 364/449; 364/424.02
[58] Field of Search .................... 364/424.01, 424.02, 364/443, 449, 442; 340/988, 989, 990, 994, 995; 73/178

[56] References Cited

U.S. PATENT DOCUMENTS

| | | | |
|---|---|---|---|
| 4,758,959 | 7/1988 | Thoone et al. | 364/449 |
| 4,774,672 | 9/1988 | Tsunoda et al. | 364/449 |
| 4,782,447 | 11/1988 | Ueno et al. | 364/449 |
| 4,951,212 | 8/1990 | Kurihara et al. | 73/178 |
| 4,963,865 | 10/1990 | Ichikawa et al. | 73/178 |
| 4,996,645 | 2/1991 | Van Der Zon | 364/449 |
| 5,016,007 | 5/1991 | Iihoshi et al. | 73/178 |
| 5,043,902 | 8/1991 | Yokoyama et al. | 340/988 |
| 5,067,082 | 11/1991 | Nimura et al. | 364/449 |
| 5,121,326 | 6/1992 | Moroto et al. | 364/449 |
| 5,159,556 | 10/1992 | Schorter | 364/449 |
| 5,179,519 | 1/1993 | Adachi et al. | 73/178 |
| 5,231,584 | 7/1993 | Nimura et al. | 364/444 |
| 5,293,163 | 3/1994 | Kakihara et al. | 340/995 |
| 5,307,278 | 4/1994 | Hermans et al. | 364/450 |

FOREIGN PATENT DOCUMENTS

| | | |
|---|---|---|
| 0355232 | 12/1988 | European Pat. Off. . |
| 0346491 | 7/1989 | European Pat. Off. . |
| 0445719A2 | 9/1992 | European Pat. Off. . |
| 3905493 | 8/1990 | Germany . |

*Primary Examiner*—Kevin J. Teska
*Assistant Examiner*—Stephen J. Walder, Jr.
*Attorney, Agent, or Firm*—Robert J. Kraus

[57] ABSTRACT

A navigation device which is operative to navigate a user along a selected route, utilizing displays of relevant map sections and the selected route. The relevant map section is updated by a control unit in accordance with changes in user's present position. The control unit includes a picture processor which controls the display unit to show in a distinctive manner within a relevant map section the route segment already travelled and the segment yet to be travelled. The resulting display can therefore be very quickly interpreted by the user.

14 Claims, 1 Drawing Sheet

NAVIGATION DEVICE VEHICLE COMPRISING THE DEVICE

This is a continuation of prior application Ser. No. 07/963,196, filed on Oct. 19, 1992, now abandoned.

BACKGROUND OF THE INVENTION

1. Field of the Invention

The invention relates to a navigation device, comprising a memory for the storage of cartographic dam, a position sensing unit, a control unit, an input unit, a picture memory and a display unit, the control unit being adapted to navigate a user along a predetermined route on the basis of data from the position sensing unit and the cartographic data, the control unit also being adapted to store in the picture memory cartographic data, selected in dependence on a current position determined by the position sensing unit, for display of a relevant map section via the display unit.

The invention also relates to a vehicle comprising such a navigation device.

2. Description of the Related Art

A navigation device of the kind set forth is known from European Patent Application 0 306 088 A1, which corresponds to U.S. Pat. No. 4,996,645, issued Feb. 26, 1991, assigned to the same assignee. The device described therein is capable of displaying a relevant map section, via a display screen, with a name relating to the current route segment, the link between the name displayed and the relevant route segment being emphasized by displaying both items in the same colour. The route itself, determined by entering a starting point and a destination point via the input unit, is not displayed.

German Offenlegungsschrift DE 39 05 493 A1 describes a navigation device where a map section around the current position of the user is displayed. The current position is indicated by a dashed circle with an arrow (see FIG. 3). The route, determined by entering all constituent junctions, is displayed as a heavy line (FIG. 3) or a dashed line (FIG. 2). The clarity of such display is far from ideal.

European Patent Application 0 355 232 A2 describes a navigation device in which a map section around the current position of the user is displayed. The predetermined route is displayed as a heavy line (see FIG. 4 or FIG. 16). The current position is displayed as a triangle (FIG. 1 or FIG. 16). The clarity of display is again far from ideal.

For the use of navigation devices in vehicles participating in traffic, it is of essential importance that information presented to the user by the navigation device does not distract the user too long. When information displayed requires an excessive interpretation time, the navigation device will be useless from a point of view of traffic safety.

SUMMARY OF THE INVENTION

It is inter alia an object of the invention to provide a navigation device which is capable of displaying a relevant map section in such a manner that the situation can be very quickly interpreted by the user. To achieve this, a navigation device in accordance with the invention is characterized in that the control unit comprises picture processing means for displaying, via the display unit, the predetermined route in a distinct manner within the relevant map section, the picture processing means representing the route segment travelled to reach said current position and the route segment to be travelled beyond said current position in a different manner.

The user can thus see at a glance where he or she is situated on the route, where he or she is coming from and where he or she is destined. Because of the different representation of the route segment already travelled and the route segment still to be travelled, it has been found that the time required for interpretation of the display is shorter than in known navigation devices. A safe navigation device is thus obtained.

It may in some situations be advantageous to display the current position. That may be in a flashing manner for enhanced clarity.

The use of two different colours for the representation of the two route segments also benefits clarity. In this respect, colours are to be understood to include also black, white or a shade of grey (for example, when use is made of a display unit in the form of a monochromatic LCD screen).

A further embodiment of a navigation device in accordance with the invention is characterized in that the picture processing means represent the direction to be followed in conformity with the predetermined route as an arrow which is directed substantially parallel to or coincident with the route. This offers more clarity, notably in the event of a change of direction.

A further embodiment of a navigation device in accordance with the invention is characterized in that the picture processing means represent the route as a double line which is filled up by a first distinct colour for the route segment preceding the current position and by a second distinct colour for the route segment beyond the current position. It has been found that this display, resembling a conventional thermometer, is very user-friendly. Moreover, less severe requirements need then be imposed as regards the distinctiveness of the two distinct colours.

When the double line is represented in the first or in the second distinct colour, there is the advantage that no additional colour is required for the double line.

A further embodiment of a navigation device in accordance with the invention is characterized in that the picture processing means are adapted to represent the current position when it is not situated on the predetermined route, the picture processing means representing the segment travelled and the segment of the predetermined route which has not yet been travelled in a distinct manner. Thus, when a user has left the predetermined route, he can see immediately where he has left the predetermined route, where he is now situated, and how the predetermined route continues.

BRIEF DESCRIPTION OF THE DRAWINGS

The invention will be described in detail hereinafter with reference to the accompanying drawings; therein

DESCRIPTION OF THE PREFERRED EMBODIMENTS

Figure 1:
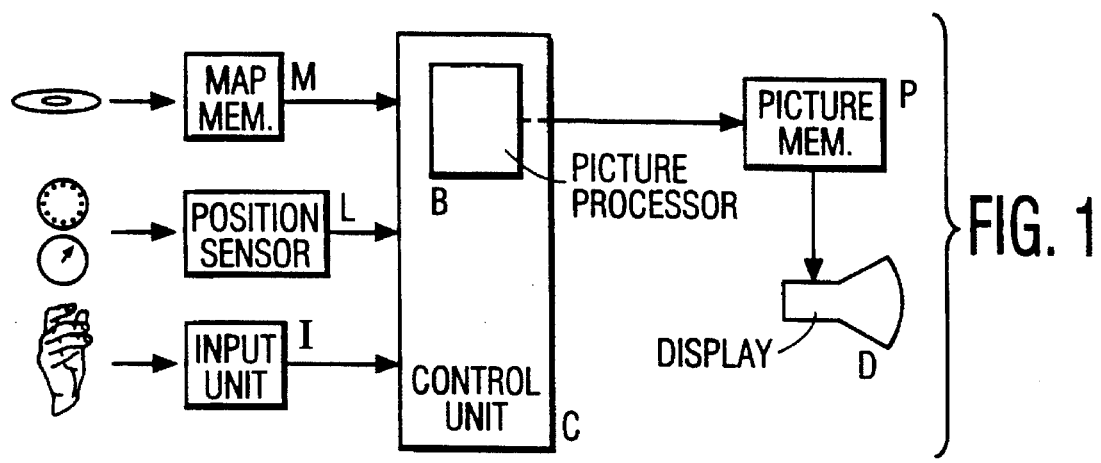
FIG. 1 shows a navigation device in accordance with the invention.

FIG. 1 shows a navigation device in accordance with the invention. The device comprises a memory M for the storage of cartographic data. This data is to be understood to include: road maps with data relating to the category of roads and intersections, applicable right-of-way rules, speed limits and other traffic rules and prohibitions, street names, traffic signs, road signs, pedestrian crossings, in other words "road furniture" and gas stations, hotels, restaurants and the like ("facilities"), and landmarks. The memory can be fed, for example via roadside beacons, via a radio link, or with data on a Compact Disc which is capable of storing as much as 4800 Mbits of digital data. The navigation device furthermore comprises a position sensing unit L which continuously determines the position of a user of the device in relation to the road map stored in the memory M. Such a position sensing unit L can be fed with signals from satellites for determining the current position, but may also operate completely autonomously, for example on the basis of measurement values from wheel sensors and a magnetic sensor. Position sensing can also be realised by means of infrared roadside beacons or via a radio communication network. The navigation device furthermore comprises an input unit I for entering an origin and a final destination by the user of the device. The device furthermore comprises a control unit C which is operative to navigate the user along a predetermined route on the basis of data from the position sensing unit L and the cartographic data stored in the memory M. If desired, the control unit C itself can also determine this route on the basis of the origin and final destination entered by the user. Navigating the user implies that the user receives timely instructions as regards changes of direction necessary to follow the predetermined route. Moreover, unclear traffic situations can also be elucidated. This is preferably realised by means of audio instructions (which, therefore, do not visually distract the user), assisted by visual displays such as relevant map sections. A relevant map section is to be understood to mean a zoomed-in section of the road map stored in the memory M and situated around the current position of the user and his vehicle, as determined by the position sensing unit L (redundant information may have been removed from this zoomed-in section), but the relevant map section may also be a stylized representation of the next intersection to be expected. To this end, the control unit C is also operative to store, in a picture memory P, cartographic data selected in dependence on the current position as determined by the position sensing unit L. This selected cartographic data from the memory M represents the surroundings of the current position of the user. These surroundings are maintained fixed per map section or traffic situation to be displayed, and at such a scale that the screen of a customary display unit is suitably filled. The control unit C comprises picture processing means B which, possibly after the generation of a stylized display on the basis of the selected cartographic data or after the removal of redundant information from the selected data, reproduce the predetermined route in a distinct manner in the map section. The content of the picture memory P is displayed via a display unit D. For the display unit use can be made of, for example an LCD screen or a picture tube, the data from the picture memory P then being displayed via a colour look-up table and a digital-to-analog converter. The picture processing means B then reproduce the route segment travelled so as to reach the current position and the route segment to be travelled beyond the current position in a different way. The current position in the constant environment is thus dynamically reproduced per map section or traffic situation. For a next map section or traffic situation to be displayed, further cartographic data is selected from the memory M so as to display a new environment of the new current position. The new current position is then preferably displayed substantially in the centre of the display, after which the new environment displayed is kept constant again, the changing current position being dynamically displayed within this environment until the environment is no longer relevant to the situation of the user. Subsequently, further cartographic information is selected from the memory M again, etc.

Figure 2A:
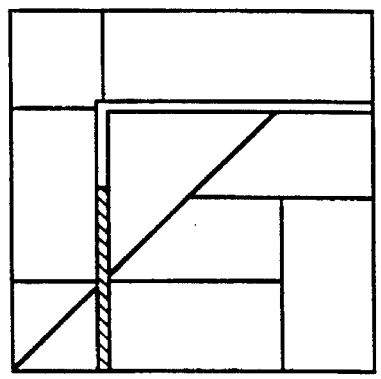
FIG. 2A, FIG. 2B and FIG. 3 show examples of displays generated by means of the picture processing means in accordance with the invention.
Figure 2B:
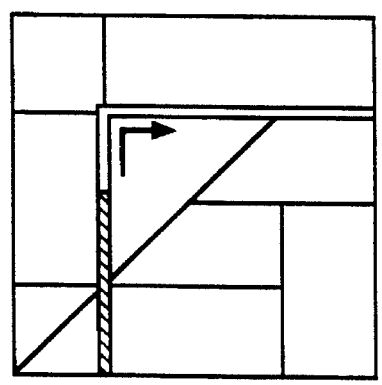
Figure 3:
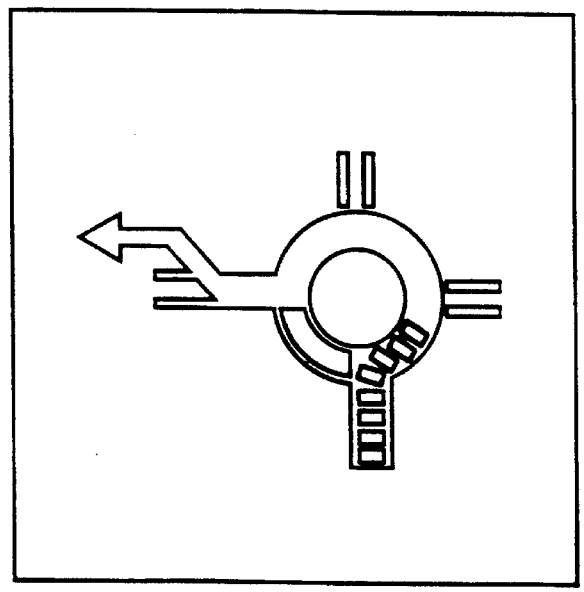

The foregoing is illustrated in the FIGS. 2 and 3. Because these Figures are printed in black and white, some aspects of the invention relating to colours have to be separately elucidated. The current position of the user can be reproduced in a flashing manner for those who consider this to be clearer, for example as a yellow, orange or red dot, possibly with a dark edge. The route segment already travelled and the route segment yet to be travelled can be represented by means of a distinct first colour and a distinct second colour, respectively. The choice of the colours used is codetermined by the colours already used in the remainder of the relevant map section reproduced. It is to be noted that colours are also to be understood to include black, white or a shade of grey. In the Figures the route segment already travelled is reproduced in black and the route segment yet to be travelled in white. Evidently, other combinations are also feasible. In FIG. 2A the route in a zoomed-in map section is represented by a double line which is filled up in black for the segment already travelled and in white for the segment yet to be travelled. This method of reproduction (the remainder of the image possibly being coloured) has been found to be very readily interpretable and hence very safe and user-friendly. Adjacent the route to be followed in FIG. 2B the direction is indicated by means of an arrow which extends parallel to the route at the area of the current position of the user. FIG. 3 is a stylized representation of a roundabout where an arrow coincident with the route yet to be travelled points out the way to the user. The route segment already travelled is represented by black rectangles and the route segment yet to be travelled is reproduced in white, the route indication being continuously adapted as the user progresses around the roundabout (the part with black rectangles increases and the white part decreases), in conformity with the current position of the user. At any instant, the user can thus see at a glance where he is situated, where he is coming from and where he is headed. It is to be noted that, generally speaking, clarity benefits when the road segment just travelled or being travelled by the user is reproduced at the bottom of and vertically in the display, in conformity with international conventions regarding traffic signs. The choice of the colours black and white in the Figures, evidently, is not an essential aspect of the invention: any pair of distinct colours is feasible, the use of the double line offers the advantage that less severe requirements need be imposed as regards the distinctiveness of the two distinct colours (because the double line isolates the colours used from the remainder of the display). When one of the distinct colours is also used as the colour for the double line, no additional colour will be required to reproduce the double line.

When a user in his vehicle deviates from the predetermined route for whatever reason, his current position is reproduced in the display by the picture processing means, for example as a distinct point (flashing or not). The predetermined route will also be reproduced, the segment already travelled and the segment not yet travelled being reproduced in a distinct manner. The user can thus readily see where he is situated, where he has left the route, and how the route continues. He can then decide to go back to the predetermined route, after which the picture processing means, as from the instant that the user follows the route again, reproduce the route and the position again as if the route had been followed. If desired, the picture processing means reproduce in a distinct manner, the route segment followed which deviates from the predetermined route, for example by means of a further distinct colour.

Moreover, like in, for example the vehicle navigation system CARIN, a new route can be determined immediately upon departure from the predetermined route, which new route will act as the predetermined route as from that instant. In that case the route actually travelled is reproduced as the route segment travelled and the (new) further predetermined route as the route segment yet to be travelled, reproduced in a distinct manner in accordance with the invention. The term "predetermined route", therefore, should be dynamically interpreted: the predetermined route can be modified during a trip, both by the navigation device (which is capable of calculating a new optimum route for the user to the destination in the case of a deviation from the previously planned route) as well as by the user himself (who enters another destination or another preferred route via the input unit). When a new route has been determined, of course, the control unit and the picture processing means adapt the display thereto. If no new route has been determined, the display is as before: a separate indication of the current position outside the route.

I claim:

1. A navigation device for navigating a user from a starting point along a selected route to a destination point, comprising:

a memory for storing cartographic data relating to the selected route;

a position sensing unit for supplying the memory with data indicative of the user's present position at any time;

an input unit for supplying the memory unit with data indicative of the user's destination;

a display unit for producing from the data in the memory a display only of a map section relevant to the user's present position and the selected route, said relevant map section showing a plurality of intersections but being only a small part of the selected route from starting to destination point and including only the most recent route segment actually followed by the user up to the present position and the next immediate route segment for the user to follow to reach eventually the user's destination point and the immediate surrounding territory of the present position, said next immediate route segment including at least the next two successive intersections requiring a decision by the user; and a control unit for controlling the data supplied from the memory to the display unit so that the relevant map section is repeatedly up-dated in accordance with actual changes in the user's position;

said control unit comprising picture processing means for further controlling the data supplied from the memory to the display unit such that in the relevant map section displayed the most recent route segment which has already actually been travelled is depicted in a first manner and the next immediate route segment which is next to be travelled including at least through said two successive intersections to reach eventually the user's destination point is depicted in a second manner different from said first manner, the remaining routes of the relevant map section, other than the most recent segment actually travelled and the next immediate route segment which is next to be travelled, being depicted in a third manner different from both the first and second manners and less apparent to a user than the first and second manners, such that the most recent route segment that has actually been travelled and the next immediate route segment that is next to be travelled are more apparent to the user.

2. A navigation device as claimed in claim 1, wherein said picture processing means controls the data supplied from the memory to the display unit so that in the relevant map section the user's current position is depicted in a flashing manner.

3. A navigation device as claimed in either of claims 1 or 2, wherein in the relevant map section an already travelled route segment is depicted in a first distinct color and a route segment which is still to be travelled is depicted in a second distinct color.

4. A navigation device as claimed in claim 3, wherein said picture processing means controls the data supplied from the memory to the display unit so that in the relevant map section an arrow is produced extending substantially parallel to or coincident with the selected route and pointing in the direction to be followed along said route.

5. A navigation device as claimed in claim 4, wherein in the relevant map section the selected route is displayed as a double line between which said first and second distinct colors are included for already travelled and still to be travelled route segments, respectively.

6. A navigation device as claimed in claim 3, wherein in the relevant map section the selected route is displayed as a double line between which said first and second distinct colors are included for already travelled and still to be travelled route segments, respectively, said remaining routes being displayed as a single line or as a double line that is narrower than that of the selected route.

7. A navigation device as claimed in claim 6, wherein the double line is in one of the first and second distinct colors.

8. A navigation device as claimed in either of claims 1 or 2, wherein said picture processing means controls the data supplied from the memory to the display unit so that in the relevant map section an arrow is produced extending substantially parallel to or coincident with the selected route and pointing in the direction to be followed along said route.

9. A navigation device as claimed in claim 1, wherein when the user's present position deviates from the selected route said picture processing means controls the data supplied from the memory to the display unit so that the user's present position is also depicted in the relevant map section.

10. The device of claim 1, wherein said relevant map section produced by the display unit does not include the starting point unless the user has just started, and does not include the destination point unless the user has nearly reached the destination point.

11. A navigation system for navigating a user from a starting point along a selected route to a destination point, comprising:

(a) means for providing cartographic data representing a map including the selected route, (b) means for determining the user's present position, (c) means for selecting from the cartographic data specific data representing a section of the map which includes the user's present position, a first route segment corresponding to the most recent route segment actually followed by the user up to the present position, a second route segment corresponding to the next immediate route segment up to and including at least the next two successive route intersections requiring a decision by the user, and other route segments in the immediate surrounding territory of the present position, (d) means for displaying the route segments corresponding to the first route segment and the second route segment when not included within the selected route in substantially the same shape as when they are included in the selected route, (e) means for displaying the first route segment and the second route segment when they are included in the selected route with respective different identifying characteristics, other than shape, which distinguish said first and second route segments from the other route segments and which also includes in the display a prominent point of demarcation where said first and second route segments meet, said demarcation point identifying the user's present position on the display.

12. A navigation method for navigating a user from a starting point along a selected route to a destination point, comprising the steps:

(a) providing cartographic data representing a map including the selected route, (b) determining the user's present position, (c) selecting from the cartographic data specific data representing a section of the map which includes the user's present position, a first route segment corresponding to the most recent route segment actually followed by the user up to the present position, a second route segment corresponding to the next immediate route segment up to and including at least the next two successive route intersections requiring a decision by the user, and other route segments in the immediate surrounding territory of the present position, (d) when not included within the selected route, displaying the route segments corresponding to the first route segment and the second route segment in substantially the same shape as when they are included in the selected route, but when they are included in the selected route displaying the first route segment and the second route segment with respective different identifying characteristics, other than shape, which distinguish said first and second route segments from the other route segments and which also includes in the display a prominent point of demarcation where said first and second route segments meet, said demarcation point identifying the user's present position on the display.

13. The method as claimed in claim 12, wherein the first route segment and the second route segment have respective different identifying colors.

14. The method as claimed in claim 12, wherein the route segments corresponding to the first route segment and the second route segment have larger dimensions when in the selected route than when not in the selected route.

\* \* \* \* \*